Dec. 28, 1965   H. LEVANOVICH   3,225,658
CUTTER SPINDLE ELEVATING MECHANISM
Filed Oct. 21, 1963   3 Sheets-Sheet 3

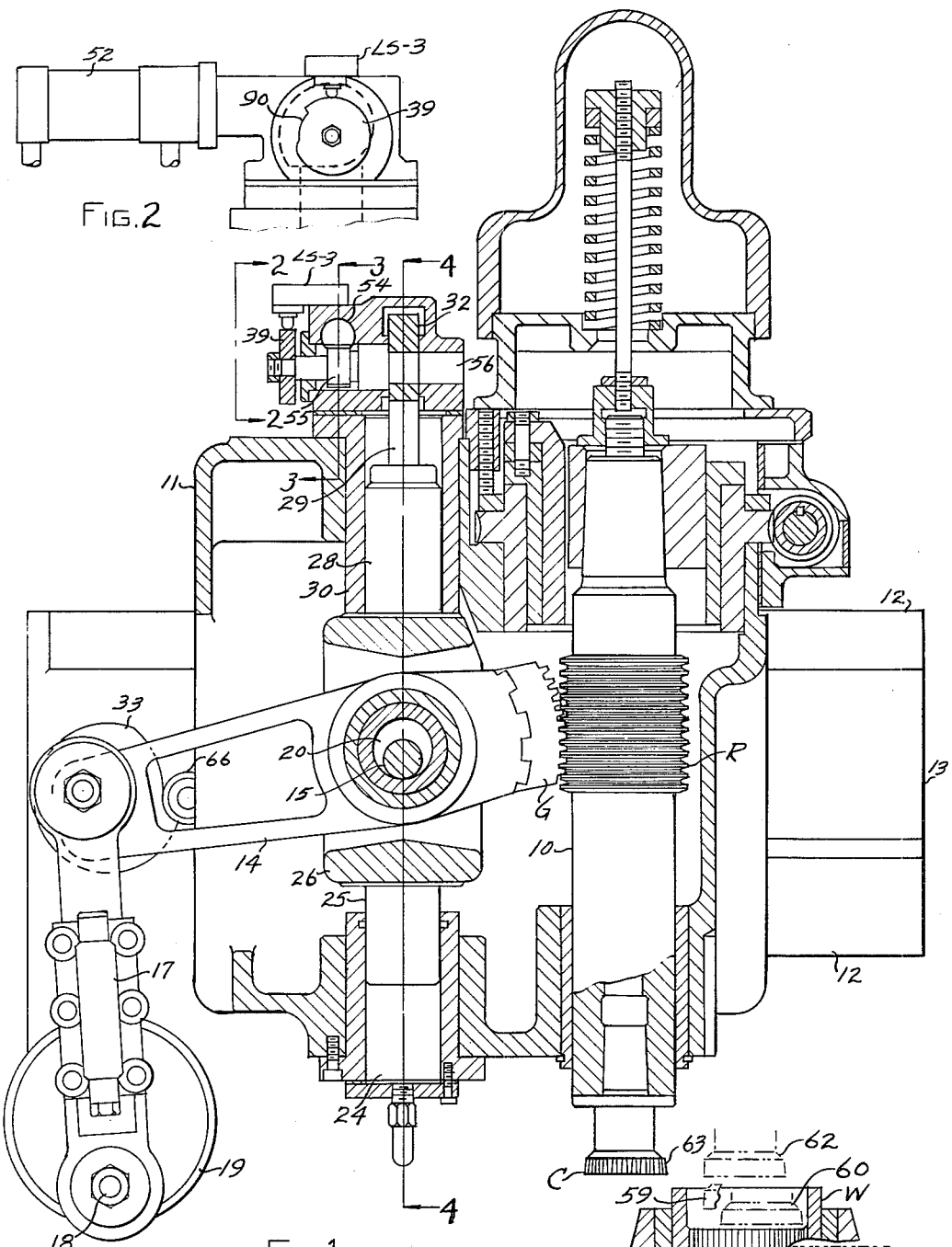

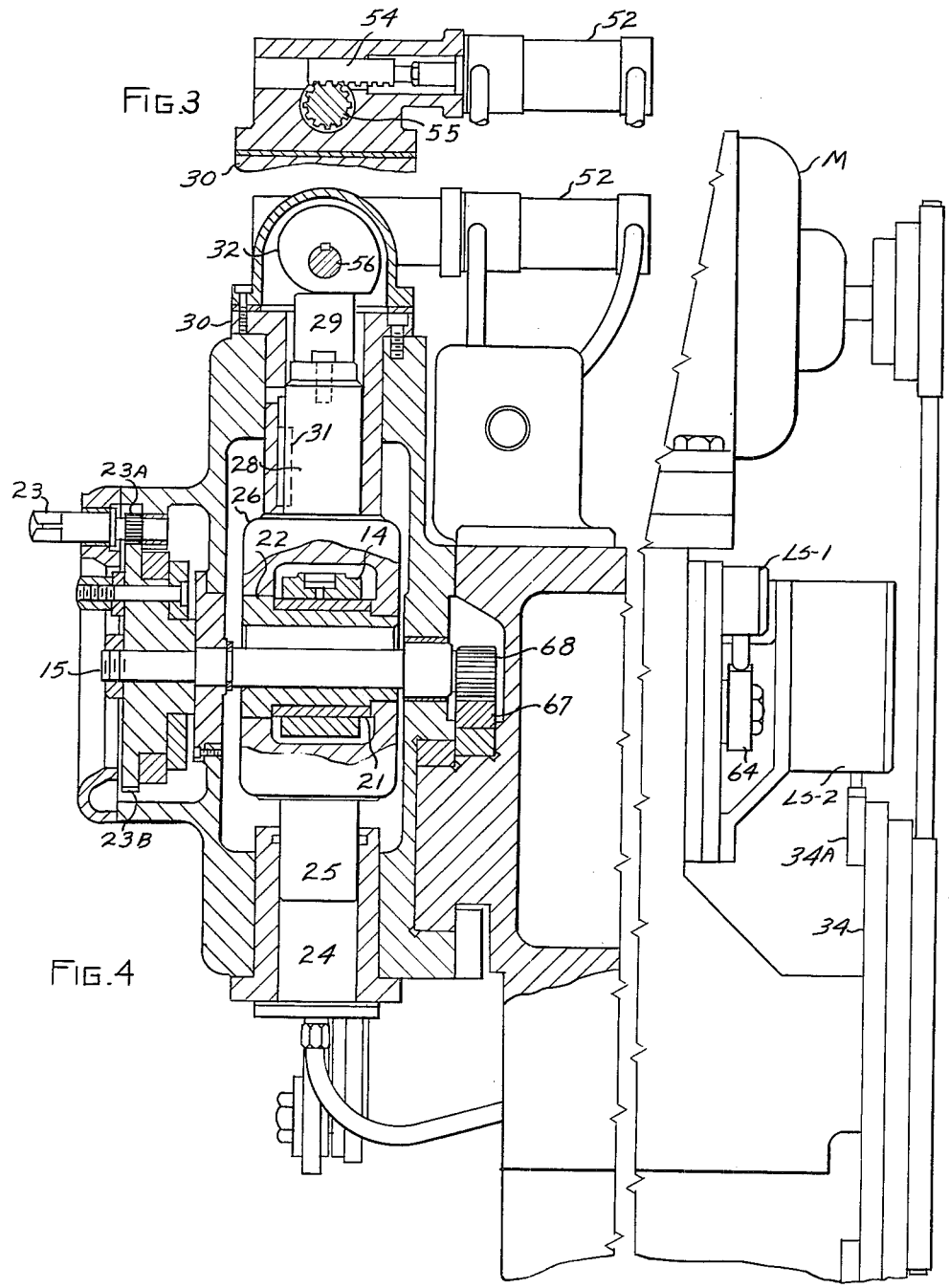

INVENTOR.
HARRY LEVANOVICH
BY
HIS ATTORNEY

United States Patent Office 3,225,658
Patented Dec. 28, 1965

3,225,658
CUTTER SPINDLE ELEVATING MECHANISM
Harry Levanovich, Springfield, Vt., assignor to The Fellows Gear Shaper Company, Springfield, Vt., a corporation of Vermont
Filed Oct. 21, 1963, Ser. No. 317,498
9 Claims. (Cl. 90—7)

The present invention relates to gear cutting machines and more particularly to a reciprocating type gear shaping machine in which a reciprocating and rotating cutter carrying spindle is disposed adjacent to a work spindle on which is mounted a work blank.

The cutter spindle and work spindle are moved toward each other until a portion of the outside diameter of the cutter mounted on the cutter spindle is brought to a position which overlaps a portion of the periphery of the work blank. Gearing between the cutter and work spindle causes timed rotation between the cutter and work blank and as the cutter is reciprocated and rotated in time with the rotation of the work teeth are formed on the adjacent portion of the work blank.

On cutting internal gears the cutter diameter is smaller than the inside diameter of the gear being cut. It is often difficult to mount internal gears and wide face gears and other work pieces of unusual length on the work spindle without interference from the cutter spindle. In many such cases it is necessary to raise the cutter spindle an amount in addition to the upper limit of its normal stroke length in order to mount or remove the work piece.

Therefore it is the principal object of the present invention to provide a mechanism on a gear shaping machine of the class described which permits the cutter carrying spindle to be raised an additional amount above its regular length of stroke so that elongated work pieces, internal gears, and wide face gear blanks may be easily mounted or removed from the work spindle.

In the drawings:

FIGURE 1 is a section taken through the cutter spindle and elevating mechanism mounted in a typical reciprocating gear shaper and showing the cutter spindle in an elevated position with the saddle backed off away from the work to allow clearance for removal of the work piece.

FIGURE 2 is a partial view taken along line 2—2 of FIGURE 1 and illustrating a cam and safety switch which maintains the hydraulic pressure to prevent the lowering of the cutter spindle at a time when the work is being removed.

FIGURE 3 is a partial sectional view taken along line 3—3 of FIGURE 1 showing a portion of the means which serves to lock the elevating mechanism in place when the cutting action takes place.

FIGURE 4 is a partial vertical section taken along line 4—4 of FIGURE 1.

Like reference characters designate the same parts wherever they occur in the various figures of the drawings.

Figure 5:
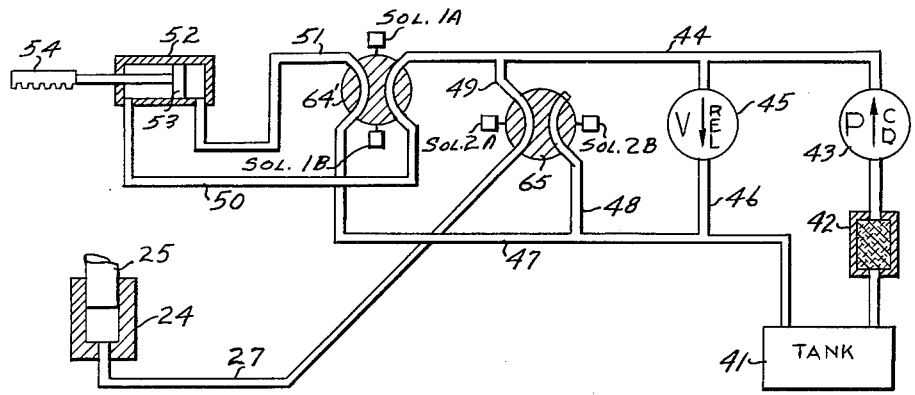
FIGURE 5 is a typical hydraulic system which may be employed to obtain the necessary movements of the cutter spindle.

A machine of the class described on which the present invention may be employed is the well-known Fellows type such as shown for example in U.S. Patent No. 2,640,397 issued June 2, 1953 to E. W. Miller. This is the type of machine in which the invention contained herein was designed to be incorporated.

The cutter spindle 10 which carries cutter C is reciprocated by operating arm 14 mounted in saddle 11, which saddle is slideable on ways 12 of portion 13 fixed to the base of the machine. The saddle slides to and from the work spindle on which work W is mounted.

Crank member 17 pivoted at 18 on disc 19 oscillates arm 14 to reciprocate spindle 10 through the usual circular rack R and segment gear mechanism G.

Shaft 15 (FIGURES 1 and 4) is rotatably journalled in saddle 11 and has mounted thereon pinion 68. Pinion 68 is in mesh with rack 67. Rotation of shaft 15 will retract or advance saddle 11 away from and toward the work spindle carrying with it arm 14, spindle 10 and yoke 26. A large clearance opening 20 in pivot bushing 22 is provided completely around shaft 15 to allow for vertical movement of yoke 26 and arm 14 with spindle 10.

As shown in FIGURES 1 and 4 the operating arm 14 is mounted on a bearing 21 which in turn is mounted on an additional pivot bushing 22. Pivot bushing 22 is held fixedy in the yoke member 26. The yoke member 26 is vertically slidable in the cutter saddle 11.

As shown in FIGURE 1 while cutting an internal gear W the gear shaper cutter spindle reciprocates between the position 59 and the bottom part of the work piece W which is to have teeth formed therein. After the work piece W has the desired work teeth formed the cutter spindle through its normal reciprocation will reach the position shown at 59. After this position is reached it is necessary to elevate the cutter spindle an additional amount to the position 62 so as to provide clearance to remove the work piece W from the work spindle. This additional cutter elevation is obtained through the mechanism of this invention.

As will be seen from FIGURE 1 the yoke member 26 has a piston projection 25 on its lower end which extends into the hydraulic cylinder 24. On its upper end the yoke member 26 has an extension 28 sliding in the bushing 30. This extension 28 has a smaller extension 29 projecting upwardly from its upper end. The extension 29 is a cam abutting portion and is in engagement with the cam 32 for the purposes described below.

A key 31 prohibits the yoke member 26 from rotating through its cooperation with the extension 28 and the sleeve member 30. The cam 32 engaging the extension 29 serves to hold the yoke down against the pressure exerted by the hydraulic fluid in the cylinder 24 coacting with the piston 25.

Figure 6:
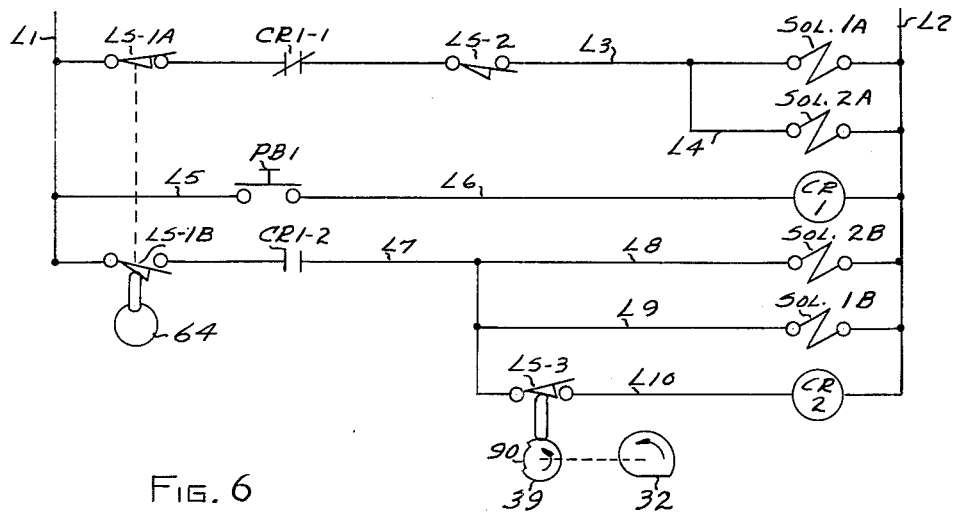
FIGURE 6 is a typical electrical system which may be employed to control the various machine elements to properly effect the cutter positioning.

The hydraulic and electric systems shown in FIGURES 5 and 6 are employed in the present invention to obtain the timed relation of sequences which is necessary to obtain the desired movements of the cutter spindle at the proper time.

A hand crank shaft 23 mounted in the saddle 11 has a pinion gear 23A mounted thereon. Pinion gear 23A rotates in mesh with a gear 23B which is mounted on and rotates shaft 15. As set forth above, on the other end of shaft 15 a pinion 68 rotates in mesh with rack 67 which slides saddle 11 along ways 12.

Rack 67 shown in FIGURE 4 is permanently fixed to the portion 13 of the machine base. Therefore rotating hand crank 23 and the related gearing will advance or retract the saddle 11, carrying with it yoke 26, arm 14 and spindle 10.

The uppermost portion of saddle 11 has a shaft 56 mounted thereon as may be seen in FIGURES 1 and 4. Shaft 56 has cams 39 and 32 fixed thereon and held against rotation relative thereto. Gear 55 is also mounted on and rotatable with shaft 56.

The outside diameter of cam 32 engages the top of extension 29. The outside diameter of cam 39 contains a recession 90 which engages with a plunger of limit switch LS3. Limit switch LS3 is mounted on the outside top of saddle housing 11 as seen in FIGURES 1 and 2.

As shown in FIGURE 3, pinion 55 which is mounted on shaft 56 is in meshing engagement with a rack 54. Rack 54 is supported for endwise movement on the uppermost portion of saddle 11 as seen in FIGURES 2 and 3. One end of rack 54 is affixed to a piston 53 which is reciprocably mounted in cylinder 52 and which is an element of the hydraulic system illustrated in FIGURE 5.

In a standard gear shaper of the class described, such as is shown in U.S. Patent No. 2,640,397, a conventional feed cam 33 is engaged with a roller 66 which drops into a recession provided for it on the outside diameter of the cam to allow the saddle 11 to back away from the work carrying with it the cutter spindle 10 and cutter C at the end of a cutting cycle. The outline of such a cam and roller are shown in FIGURE 1.

Related gearing is not shown since it is not pertinent to the present invention.

A switch cam 64 (FIGURE 4) is mounted on a depth feed cam shaft not shown herewith, but which is illustrated in FIGURE 15 and designated by numeral 34 in the aforesaid patent.

Switch cam 64 corresponds to a like switch cam 64 in said patent also.

In the present invention switch cam 64 is rotated with depth feed cam 33 and at a time just after roller 66 drops into the recession on depth feed cam 33 to bring the saddle, spindle 10 and cutter C to the upper and rearward position as designated by number 59 in FIGURE 1, then the switch cam 64 actuates switch LS1.

In the electrical diagram shown in FIGURE 6 at the start of an elevating cycle switch LS1A which is a component of LS1 is actuated by switch cam 64 and becomes closed when the roller 66 is in the recession provided on the periphery of feed cam 33 at a time when the cutter and spindle have backed off from the position shown at 60 to a position shown at 59 in FIGURE 1.

The contactor CR 1–1 between lines L–1 and L–3 is normally closed. Contactor CR 1–1 is a contractor of the coil of relay CR1 on line L–6.

After cutter C backs off from the cutting position 60 to the backed off position 59 and the spindle 10 reaches the top of its normal stroke at the position indicated by numeral 59 (FIGURE 1) the spindle is then in a position to be elevated further. At this time the proximity switch LS2 between lines L–1 and L–3 becomes closed. In FIGURE 4 switch LS2 may be seen being actuated by a projection 34A on pulley 34.

This connects lines L–1 with line L–3 and energizes solenoid 1A and solenoid 2A. Solenoid 1A and solenoid 2A rotate valves 64' and 65 (see FIGURE 5) respectively ninety degrees clockwise to the position shown in FIGURE 5 to connect hydraulic line 44 with line 50; and also line 51 with exhaust line 47 which leads to tank 41.

The pressure in cylinder 52 exerted by fluid from line 50 causes piston 53 and rack 54 to retract and by so doing rotates pinion 55 and shaft 56 and cam 32 is rotated to the position shown in FIGURE 4 so that the yoke 26 may be raised to the position shown in that figure.

The energization of solenoid 2A rotates valve 65 ninety degrees to a position as shown in FIGURE 5 whereby line 44 is connected with line 27 so that pressure in cylinder 24 can build up to elevate piston 25 and lift the elevating mechanism and spindle 10.

While cam 32 is being rotated pressure is being exerted in piston 25. This pressure serves to move yoke 26 upwardly carrying with it bushing 22 and correspondingly operating arm 14. Since circular rack R and segment gear G remain in mesh, upward movement of arm 14 will lift the cutter spindle 10 from position 59 as seen in FIGURE 1 to position 62 and the cutter C will then be clear of the work piece W.

When the cutter spindle reaches the top of its additional length of stroke to a position seen at 62 in FIGURE 1 it may be moved to the left to a position indicated at 63. The leftward movement as viewed in FIGURE 1 may be obtained manually or by any type of well known mechanism well known in the art, in order to get the cutter C to a position which will facilitate easy loading or unloading of work W. A well known mechanical counterbalance mechanism used to obtain the desired movement may be seen in FIGURES 3 and 4 of the patent referred to above.

With the cutter elevated and the saddle to the left the loading or unloading of the work piece can be easily accomplished.

In the hydraulic diagram (FIGURE 5) all units are shown in position for keeping the cutter spindle in an elevated position such as shown in FIGURES 1 and 4 in which pressure is applied in cylinder 24 through line 27 to raise piston 25.

A tank 41 contains the fluid for supplying the hydraulic pressure to the various lines. This fluid is kept free of any impurities that might slow down the functioning of the present mechanism by passing through filter 42. Pump 43 is a constant delivery pump which keeps a standard amount of pressure in line 44. A relief valve 45 is provided on line 46 between line 44 and return line 47. Line 48 connects return line 47 and valve 65. Line 49 connects line 44 and valve 65. Lines 50 and 51 are connected to cylinder 52 and valve 64'. These lines actuate piston 53 and rack 54 which actuate the locking mechanism including cam 32 when the spindle 10 and cutter C are in a cutting position. Line 27 connects valve 65 and cylinder 24.

The cutter elevating mechanism as shown is in a raised position and piston 25 is raised and rack 54 withdrawn leaving cam 32 in an unlocked position. Before lowering the cutter spindle 10, saddle 11 must be brought back until cutter C is over the cutting zone to a position shown at 62.

To lower the cutter spindle to its normal cutting position push button PB1 is manually actuated and solenoid 1B and solenoid 2B are energized to rotate valves 64' and 65 counter-clockwise. Line 51 becomes connected with line 44 and line 50 becomes connected with exhaust line 47. Line 27 becomes connected with line 48 and exhaust line 47.

The actuation of push button PB1 energizes the coil of relay CR1 between lines L6 and L2 which closes contactor CR 1–2 on line L7 and opens the contactor CR 1–1 on line L3.

After push button PB1 is released its contact has broken the connection between lines L5 and L6. Coil of relay CR1 locks up and continues to stay energized because its contactor CR 1–2 between lines L1 and L7 is kept closed because switch LS1B became closed by switch cam 64. It will be noted that LS1B and LS1A in the electrical diagram are components of limit switch LS1 of the mechanical drawing FIGURE 4, and when one of these two switches LS1B or LS1A is closed the other one is opened and when the same one is opened the other is closed.

Cylinder 24 is emptied as piston 25 lowers and brings arm 14 and spindle 10 down to normal cutting position.

Piston 53 and rack 54 advance to rotate pinion 55 and shaft 56 and cam 32 to gradually lock the elevating mechanism in place as the spindle is lowered. When cam 32 has rotated until its highest point is in contact with extension 29 the elevating mechanism has brought the spindle back down to its normal cutting position 59 (FIGURE 1).

Safety limit switch LS3 prevents motor M and the normal cutting reciprocation of spindle 11 from starting while the spindle 10 is being raised or lowered. After the spindle is lowered to its normal cutting position and cam 32 locks extension 29 against any upward movement the plunger of LS3 drops into recession 90 of cam 39 and on line L10 (FIGURE 6) LS3 closes to energize the circuit on line L10 and CR2 energizes to start motor M of the machine and the normal reciprocation of spindle 10 can begin.

The rotation of feed cam 33 gradually feeds the cutter in to depth in a manner which is well known in the art.

What I claim is:

1. In a machine of the character described, a saddle, a cutter spindle mounted in said saddle, a work spindle mounted adjacent to said cutter spindle, a yoke slidably mounted in said saddle, a pivot bushing fixed in said yoke, an operating arm mounted to oscillate on said pivot bushing, means to oscillate said operating arm, means connecting said operating arm to said cutter spindle so as to reciprocate said cutter spindle as said operating arm is oscillated, and means to move said yoke vertically whereby said cutter spindle is given a vertical movement in addition to that imparted to it by said oscillating operating arm said last named means being actuated by a timing mechanism responsive to a given amount of relative rotation of said cutter and work spindle whereby said additional vertical movement is given to said cutter spindle to allow clearance between cutter and work after said given relative rotation occurs.

2. A machine of the character described in claim 1 in which a stop means is in abutting engagement with said yoke, said means serving to limit the vertical movement of said yoke as it is moved upwardly.

3. A machine of the character described in claim 2 in which said stop means is moved to a position to hold said cutter spindle in cutting position when said yoke is moved vertically downward to carry said cutter spindle into proximity to said work spindle.

4. In a gear shaper of the character described, a saddle, a cutter spindle rotatably and reciprocably mounted in said saddle, a work spindle rotatably mounted adjacent to said cutter spindle to hold a work piece in a position to be subjected to a cutting action by a cutter mounted on said cutter spindle, a yoke member mounted in said saddle for vertical movement therein, a pivot bushing fixed in said yoke member, an operating arm mounted on said pivot bushing for oscillating movement thereon, means to oscillate said operating arm, means connecting said operating arm to said cutter spindle whereby as said operating arm is oscillated, said cutter spindle will be reciprocated, means to move said yoke member vertically, said movement of said yoke carrying with it said operating arm and said cutter spindle in order to avoid interference by said cutter spindle with loading and unloading of said work piece, said last named means being actuated by a timing mechanism responsive to a given amount of relative rotation of said cutter and work spindle whereby said additional vertical movement is given to said cutter spindle to allow clearance between cutter and work after said given relative rotation occurs and means to limit the movement of said yoke to a predetermined amount.

5. In a gear shaper of the character described in claim 4 in which said last mentioned means consists of a cam, which cam is in abutting relation to the upper end of said yoke, said cam being so formed as to limit the upper movement of said yoke and also to hold said yoke and said cutter spindle in cutting relation relative to said work spindle.

6. In a gear shaper of the character described in claim 5 in which said cam is mounted on a shaft rotatably mounted on said saddle, a pinion fixed to said shaft, a rack in meshing engagement with said pinion, and means to impart movement to said rack whereby said cam is rotated to control the movement of said yoke in timed relation to the desired movement of said cutter spindle.

7. In a gear shaper of the character described, a cutter spindle carrying saddle, a cutter spindle rotatably and reciprocably mounted in said saddle, a rotatably mounted work spindle disposed adjacent to said cutter spindle in a position to hold a work piece so that said work piece may be incised by a cutter mounted on said cutter spindle, a member slidably mounted in said saddle and being disposed parallel to said cutter spindle, an operating arm, a pivotal connection between said operating member and said slidable member, means to oscillate said operating arm, means connecting said last named means to said operating arm, means connecting said operating arm to said cutter spindle, means to impart motion to said slidable member when said cutter spindle reaches the end of a cutting cycle so as to give to said cutter spindle an increment of movement in addition to that obtained through its normal reciprocation in order to avoid interference with the loading and unloading of said work piece on said work spindle, said additional movement of said slidable member serving to carry said pivoted connection and correspondingly said operating arm and said cutter spindle vertically said last named means being actuated by a timing mechanism responsive to a given amount of relative rotation of said cutter and work spindle whereby said additional vertical movement is given to said cutter spindle to allow clearance between cutter and work after said given relative rotation occurs.

8. In a gear shaper of the character described in claim 7 in which a means limiting motion of said slidable member to a predetermined amount is employed, said means consisting of a cam in abutting relation to said slidable member, said cam being so formed as to limit upward movement of said slidable member and also serving to hold said slidable member and correspondingly said cutter spindle in its desired downward position.

9. In a gear shaper of the character described in claim 8 in which said cam is mounted on a shaft rotatably mounted on said saddle, a pinion fixed to said shaft, a rack in meshing engagement with said pinion, and means to impart movement to said rack whereby said cam is rotated to control the movement of said yoke in timed relation to the desired movement of said cutter spindle.

References Cited by the Examiner
UNITED STATES PATENTS

| | | | |
|---|---|---|---|
| 1,662,109 | 3/1928 | Fellows | 90—7 |
| 2,756,642 | 7/1956 | Miller | 90—7 |

WILLIAM W. DYER, Jr., *Primary Examiner.*